US009689493B2

United States Patent
Lundberg

(10) Patent No.: US 9,689,493 B2
(45) Date of Patent: Jun. 27, 2017

(54) SYSTEM AND METHOD FOR MINIMAL DRAINDOWN IN CVT

(71) Applicant: GM Global Technology Operations LLC, Detroit, MI (US)

(72) Inventor: Philip C. Lundberg, Keego Harbor, MI (US)

(73) Assignee: GM Global Technoloogy Operations LLC, Detroit, MI (US)

( * ) Notice: Subject to any disclaimer, the term of this patent is extended or adjusted under 35 U.S.C. 154(b) by 158 days.

(21) Appl. No.: 14/269,785

(22) Filed: May 5, 2014

(65) Prior Publication Data

US 2014/0357435 A1    Dec. 4, 2014

Related U.S. Application Data

(60) Provisional application No. 61/829,338, filed on May 31, 2013.

(51) Int. Cl.
*F16H 61/662*    (2006.01)

(52) U.S. Cl.
CPC ............... *F16H 61/66272* (2013.01); *F16H 2061/66277* (2013.01); *F16H 2312/14* (2013.01)

(58) Field of Classification Search
CPC ..... F16H 61/66272; F16H 2061/66277; F16H 2061/66281; F16H 2312/14; Y10T 477/624
See application file for complete search history.

(56) References Cited

U.S. PATENT DOCUMENTS

| | | | |
|---|---|---|---|
| 5,201,687 A * | 4/1993 | Friedmann | F16H 61/66272 474/18 |
| 6,344,016 B1 | 2/2002 | Eguchi | |
| 6,390,947 B1 | 5/2002 | Aoki et al. | |
| 6,517,455 B1 * | 2/2003 | Van Wijk | F16H 61/0021 474/18 |
| 6,669,598 B2 | 12/2003 | Berger et al. | |
| 6,712,724 B2 * | 3/2004 | Katou | F16H 61/0031 474/18 |
| 7,918,753 B2 * | 4/2011 | Murakami | F16H 61/66272 474/18 |
| 8,016,718 B2 * | 9/2011 | Ohshima | F16H 61/0021 475/116 |
| 8,056,666 B2 * | 11/2011 | Portell | F16H 61/0021 180/165 |
| 8,568,262 B2 * | 10/2013 | Moorman | F16H 61/0021 475/129 |
| 2010/0311538 A1* | 12/2010 | Miyabe | F16H 61/0031 477/2 |

(Continued)

*Primary Examiner* — Minh Truong

(57) ABSTRACT

A hydraulic control system for a transmission is provided. The hydraulic control system provides a latching system to retain CVT clutch pressure and/or pulley pressure for one or more CVT torque transmitting mechanisms and/or CVT pulleys in a CVT transmission. Components of the hydraulic control system of the present disclosure may include blow off valves, such as ball check-valves, on the exhaust of the pulley control valves and the exhaust of the CVT clutch control valve(s), and a one-way valve, such as a supply ball check-valve, disposed adjacent to each of the fluid supply inlets of the pulley control valves and the fluid supply inlet of the CVT clutch control valve(s).

4 Claims, 3 Drawing Sheets

(56) References Cited

U.S. PATENT DOCUMENTS

| | | | |
|---|---|---|---|
| 2011/0040463 A1* | 2/2011 | Moses | F16H 59/68 |
| | | | 701/63 |
| 2011/0077124 A1* | 3/2011 | Moorman | F16H 61/0021 |
| | | | 477/152 |
| 2013/0232962 A1* | 9/2013 | Marin | F15B 9/00 |
| | | | 60/327 |
| 2014/0163845 A1* | 6/2014 | Otanez | F02D 29/02 |
| | | | 701/112 |
| 2015/0144207 A1* | 5/2015 | Inagaki | F16H 61/00 |
| | | | 137/487.5 |

* cited by examiner

SYSTEM AND METHOD FOR MINIMAL DRAINDOWN IN CVT

CROSS-REFERENCE TO RELATED APPLICATIONS

This application claims the benefit of U.S. Provisional Application No. 61/829,338, filed on May 31, 2013, which is herein incorporated by reference in its entirety.

FIELD

The invention relates to a hydraulic control system for an automotive transmission, and more particularly, to a hydraulic control system for a belt-type continuously variable transmission having pulleys.

BACKGROUND

Continuously variable transmissions (CVTs) include a continuously variable unit, such as a belt and pulley mechanism. The effective ratio of the CVT is determined by the radius at which the belt engages the pulleys. In most instances, the ratio can be varied from an underdrive to an overdrive. CVTs typically include a first cone pulley pair on an input shaft as a primary pulley set and a second cone pulley pair on an output shaft as a secondary pulley set. Each cone pulley pair consists of a first axially stationary pulley and a second axially movable pulley. Between the cone pulley pairs rotates a belt, chain or torque transmission member which is wound around each cone pulley pair. The running radius of the torque-transmitting belt may be adjusted by adjustment of the cone pulley pairs. Adjustment of the cone pulley pairs, accordingly, adjusts the running radius of the pulley at the input shaft and output shaft, thereby adjusting the output/input speed ratio of the CVT.

In order to adjust the primary or secondary pulley set, the respective axially movable pulley is actuated with a pressure medium from a pressure source. The ratio of the CVT is changed by reducing or increasing the pressure acting on one of the sheave halves of one of the pulleys, generally the input pulley, while the pressure at the other pulley may be maintained substantially constant. The continuously variable unit requires a high pressure to ensure sufficient clamping forces for the belt and pulley mechanism, as slippage of the belt against the pulleys is often undesirable. The amount of clamping pressure required is a function of the input torque to the transmission and the ratio at which the variable transmission unit is operating. If the clamping pressure is low, there is a possibility of belt slippage.

The control pressure level required to engage the torque transmitting mechanisms is generally lower than the pressure required to control the CVT pulleys. The amount of pressure required in the torque transmitting mechanisms is essentially a function of torque being transmitted and size of the conventional clutch hardware, consisting of a movable piston and a clutch pack. If the control pressure is below the required value, slippage of the friction plates can occur, which will shorten the life of the torque transmitting mechanisms.

In order to increase the fuel economy of motor vehicles having conventional planetary gear automatic transmissions, it has been desirable to stop the engine during certain circumstances, such as when stopped at a red light or idling. However, after the engine has been shut down and has remained off for an extended period of time, the fluid generally tends to drain down from the passages into a transmission sump under the force of gravity. Upon engine restart, the transmission may take an appreciable amount of time to establish pressure before full transmission operation may resume. Such engine start/stop algorithms have typically not been used in CVT transmission systems due to the extra amount of time and fluid pressure that it would take to bring the CVT transmission up to the pressure that it needs to properly operate the pulleys without belt slippage.

SUMMARY

A hydraulic control system for a CVT transmission is provided that allows for engine start/stop techniques to be used in the CVT transmission. The present disclosure provides a latching system to retain CVT clutch pressure and/or pulley pressure for one or more CVT torque transmitting mechanisms and/or CVT pulleys in a CVT transmission.

Components of the hydraulic control system of the present disclosure may include blow off valves, such as ball check-valves, on the exhaust of the pulley control valves and the exhaust of the CVT clutch control valve(s), and exhaust ports of the line pressure control valve and a one-way valve, such as a supply ball check-valve, disposed adjacent to each of the fluid supply inlets of the pulley control valves and the fluid supply inlet of the CVT clutch control valve(s).

In one form, a hydraulic control system for a continuously variable transmission is provided. The hydraulic control system includes a source of pressurized hydraulic fluid configured to communicate pressurized hydraulic fluid via a supply line. A pulley control circuit is configured to fill a plurality of pulleys with pressurized hydraulic fluid and axially move at least one pulley of the plurality of pulleys to adjust a speed ratio. The pulley control circuit includes a pulley control valve assembly having a pulley valve inlet and a pulley valve outlet. The pulley valve inlet is in downstream fluid communication with the supply line. The pulley valve outlet is in fluid communication with the plurality of pulleys. An inlet valve is disposed in downstream fluid communication with the supply line. The inlet valve is configured to selectively communicate fluid from the supply line to the pulley control valve assembly. The inlet valve is further configured to close to keep fluid pressure in the pulley control circuit when fluid pressure in the pulley control circuit exceeds fluid pressure in the supply line.

In another form, a hydraulic control system for a continuously variable transmission is also provided. The hydraulic control system includes a source of pressurized hydraulic fluid configured to communicate pressurized hydraulic fluid via a supply line. A pulley control circuit is configured to fill a plurality of pulleys with pressurized hydraulic fluid and axially move at least one pulley of the plurality of pulleys to adjust a speed ratio. The pulley control circuit includes a pulley control valve assembly having a pulley valve inlet, a first pulley valve outlet, and a second pulley valve outlet. The pulley valve inlet is in downstream fluid communication with the supply line. The first pulley valve outlet is in fluid communication with the plurality of pulleys. A pulley exhaust circuit is in downstream fluid communication with the second pulley valve outlet. The pulley exhaust circuit fluidly communicates with a pulley blow-off valve.

In yet another form, a hydraulic control system for a continuously variable transmission is further provided. The hydraulic control system includes a source of pressurized hydraulic fluid configured to communicate pressurized hydraulic fluid via a supply line. A pulley control circuit is configured to fill a plurality of pulleys with pressurized hydraulic fluid and axially move at least one pulley of the plurality of pulleys to adjust a speed ratio. The pulley control circuit includes a pulley control valve assembly having a pulley valve inlet and a pulley valve outlet. The pulley valve inlet is in downstream fluid communication with the supply line. The pulley valve outlet is in fluid communication with the plurality of pulleys. An accumulator circuit is in upstream fluid communication with the pulley control valve assembly. The accumulator circuit is in downstream fluid communication with the supply line.

Further features, aspects and advantages of the present disclosure will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
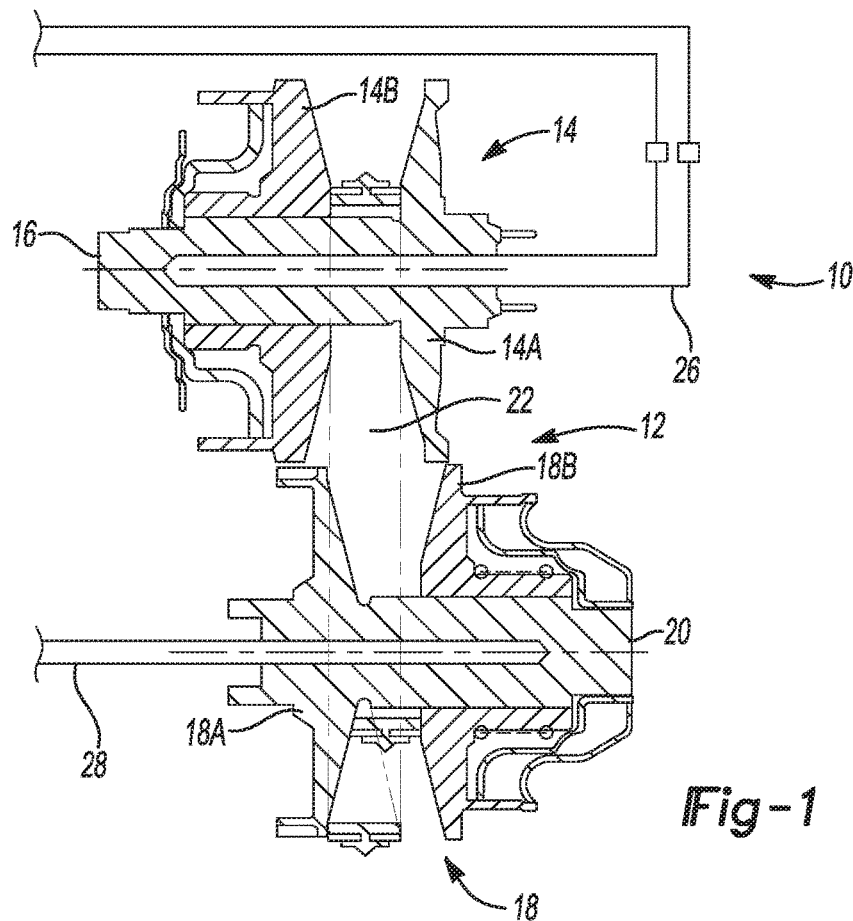
FIG. 1 is a flow diagram of a portion of a hydraulic control system according to the principles of the present disclosure.

With reference to FIG. 1, a portion of a hydraulic control system 10 including a continuously variable transmission (CVT) 12 is illustrated. The CVT 12 includes a belt and pulley mechanism having a primary pulley set 14 on an input shaft 16 and a secondary pulley set 18 on an output shaft 20. The primary pulley set 14 and the secondary pulley set 18 each have an axially stationary pulley 14A, 18A and a second axially movable pulley 14B, 18B. Between the primary and secondary pulley sets 14, 18 rotates a belt 22 or torque transmission member which is wound around the primary and secondary pulley sets 14, 18. The running radius of the torque-transmitting belt 22 may be adjusted by adjustment of the pulley sets 14, 18. For example, in the illustrated embodiment, the first and/or second axially moveable pulleys 14B, 18B may be moved in an axial direction to adjust the running radius of the belt 22, thus adjusting the running radius of the pulley at the input shaft 16 and output shaft 20, thereby adjusting the output/input speed ratio of the CVT 12.

In order to adjust the primary or secondary pulley 14, 18, the hydraulic control system 10 is in fluid communication with the pulley sets 14, 18 to fill the pulleys 14B, 18B and to cause the movable pulleys 14B, 18B to move away from the axially stationary pulleys 14A, 18A to adjust the CVT torque ratio. To move the respective axially movable pulley 14B, 18B, each is actuated with a pressure medium from a pressure source through the hydraulic control system 10. In some embodiments, the torque ratio of the CVT 12 is changed by reducing or increasing the pressure acting on one of the sheave halves of one of the pulley sets 14, 18 through control pressure lines 26, 28 while the pressure at the other pulley set 14, 18 may be maintained substantially constant.

Figure 2A:
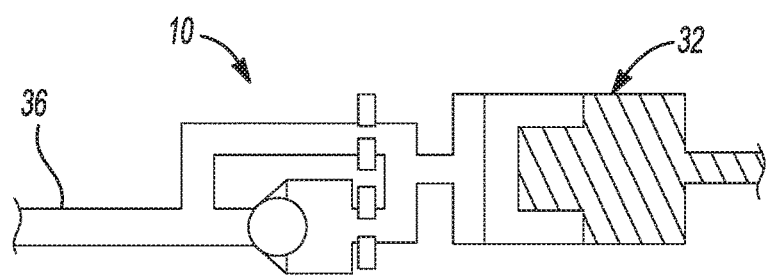
FIG. 2A is a flow diagram of another portion of the hydraulic control system of FIG. 1, in accordance with the principles of the present disclosure.
Figure 2B:
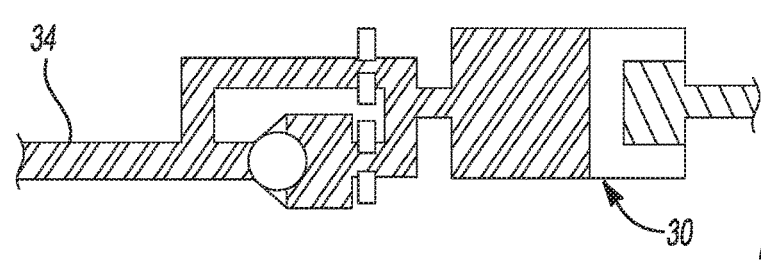
FIG. 2B is a flow diagram of another portion of the hydraulic control system of FIG. 1, in accordance with the principles of the present disclosure.

Referring now to FIG. 2, the hydraulic control system 10 also communicates with a drive CVT clutch 30 and a reverse CVT clutch 32 through a pair of CVT clutch input lines 34, 36. When either the drive CVT clutch 30 or the reverse CVT clutch 32 is engaged, hydraulic fluid is fed into one of the inlet lines 34, 36 of the CVT clutches 30, 32. The hydraulic control system 10 in communication with the CVT clutches 30, 32 will be described in more detail with reference to FIG. 4 below.

Figure 3:
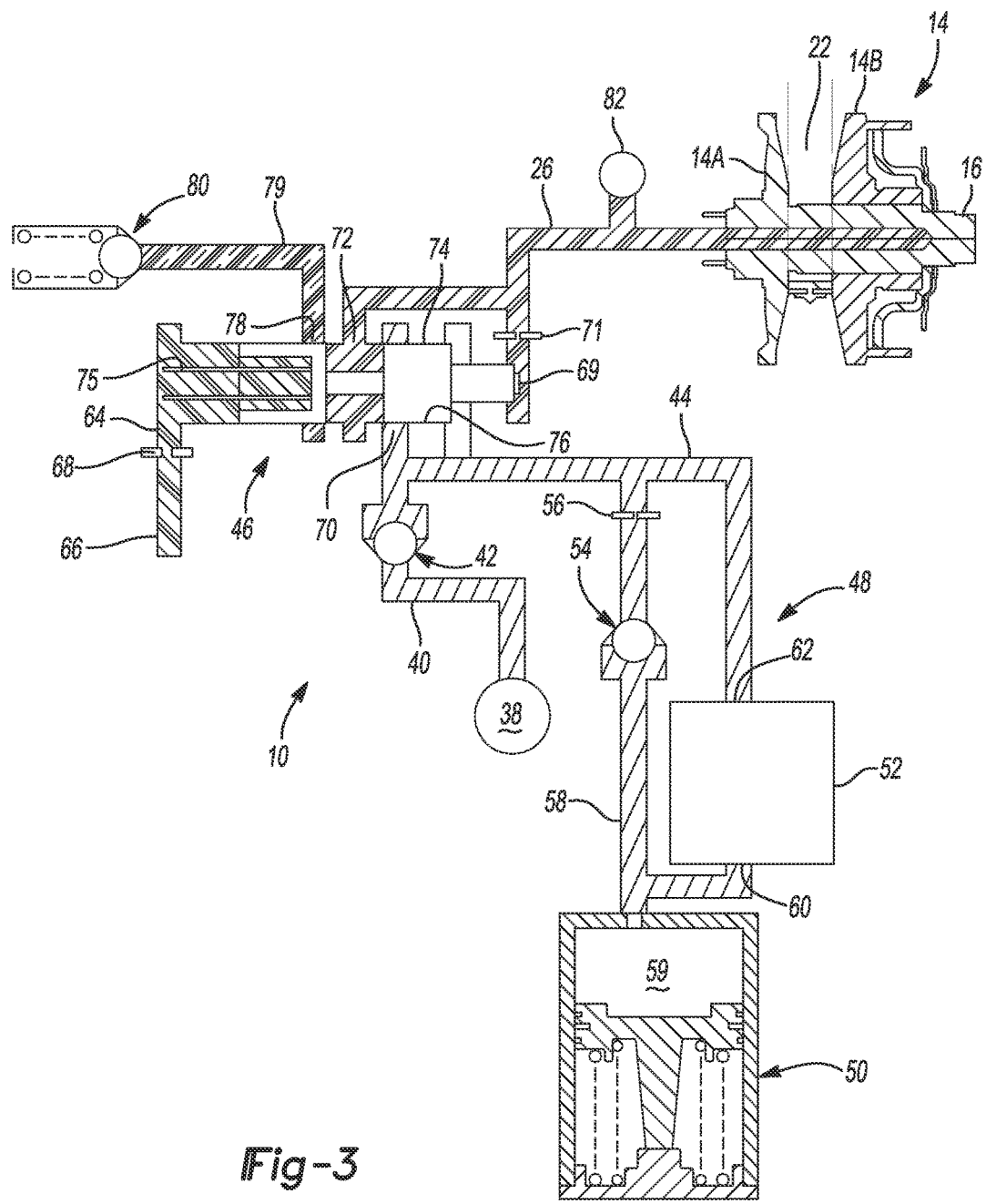
FIG. 3 is a flow diagram of the hydraulic control system of FIG. 1 including additional portions thereof, according to the principles of the present disclosure.

Referring now to FIG. 3, a portion of the hydraulic control system 10 is illustrated communicating with one of the pulley sets 14, 18. At the outset it should be appreciated that the portion of the hydraulic control system 10 shown in the figures is exemplary and that other configurations may be employed. It should be understood that the pulley set illustrated in FIG. 3 could be either of the primary and second pulley sets 14, 18, as both could have similar or same components.

The hydraulic control system 10 has a source 38 of pressurized hydraulic fluid, such as a pump connected to a sump, which communicates the hydraulic fluid under pressure to a pressure supply line 40. The source 38 of pressurized fluid could originate with a main line circuit or from an actuator feed circuit, by way of example. The pressure supply line 40 is connected to a one-way valve, such as a ball check-valve 42 that selectively communicates the pressurized hydraulic fluid from the pressure supply line 40 to a valve supply line 44. The valve supply line 44 is in communication with a pulley control valve 46 and an accumulator circuit 48. One or more controllers (not shown) and/or solenoids (not shown) may control various components of the hydraulic control system 10, by way of example. The sump (not shown) is a tank or reservoir to which the hydraulic fluid returns and collects from various components and regions of the CVT transmission. The hydraulic fluid is forced from the sump (not shown) and communicated throughout the hydraulic control system 10 via the pump (not shown). The pump may be, for example, a gear pump, a vane pump, a gerotor pump, or any other positive displacement pump. The pressure supply line 40 and/or the valve supply line 44 may include various optional features including, for example, a spring biased blow-off safety valve, a pressure side filter, a spring biased check valve or other valves.

The accumulator circuit 48 includes an accumulator 50, a stop/start solenoid or on/off valve 52, and, optionally, a one-way valve 54. The accumulator circuit 48 may also include other optional components, such as, for example, a pressure sensor or estimator, a volume sensor, a position sensor, or other components. The valve supply line 44 communicates with the one-way valve 54 of the accumulator circuit 48 through a flow restrictor or narrowed orifice 56, and the one-way valve 54 connects the valve supply line 44 with an accumulator circuit line 58. The accumulator circuit line 58 is in communication with a chamber 59 of the accumulator 50 and a first port 60 of the stop/start solenoid valve 52. The stop/start solenoid valve 52 also has a second port 62 that is in communication with the valve supply line 44.

While the accumulator circuit 48 is illustrated as being connected to and therefore charged by the valve supply line 44, it should be understood that the accumulator 50 or the accumulator circuit 48 could alternatively be filled by a different hydraulic circuit, without falling beyond the spirit and scope of the present disclosure. An example of an accumulator 50 for use with the present invention is disclosed in commonly assigned U.S. Pat. No. 8,387,665 filed Dec. 10, 2009, hereby incorporated by reference as if fully disclosed herein. The accumulator circuit 48 is operable to supply pressurized fluid back to the valve supply line 44. The accumulator 50, when charged, effectively replaces the source 38 as the source of pressurized hydraulic fluid, thereby eliminating the need for the pump to run continuously.

The accumulator 50 is charged by the valve supply line 44 when the engine is running, through the orifice 56 and the one-way valve 54, which is illustrated in the form of a ball check-valve. Whenever pressure in the valve supply line 44 exceeds the pressure in the accumulator circuit line 58, pressurized hydraulic fluid flows from the valve supply line 44, through the one-way valve 54, and into the accumulator circuit line 58 and the accumulator 50. The start/stop solenoid valve 52, which may be a solenoid or any other suitable type of valve, may be normally closed. Thus, hydraulic fluid becomes trapped in the accumulator circuit line 58 and the accumulator 50 when the pressure in the accumulator circuit 48 exceeds the pressure in the valve supply line 44. The start/stop solenoid valve 52 is used to discharge the accumulator 50, which will be described in further detail below.

In an alternative embodiment, the one-way valve 54 and orifice 56 may be eliminated, and the accumulator 50 may be both charged and discharged by the start/stop solenoid valve 52. In other words, the start/stop solenoid valve 52 may be opened to allow fluid to flow from the valve supply line 44 to the accumulator 50, and then closed to hold the fluid therein. When it is desired to discharge the accumulator 50, the start/stop solenoid valve 52 can then be opened to release the fluid pressure from the accumulator 50 to the valve supply line 44.

The pulley control valve 46, which may be controlled by a solenoid (not shown), for example, includes an inlet port 64 to receive signal pressure from a signal pressure line 66. A flow restrictor or narrowed orifice 68 may be disposed in the signal pressure line 66 adjacent to the inlet port 64. The pulley control valve 46 includes in a supply inlet port 70 in fluid communication with the valve supply line 44. An outlet port 72 is in communication with the primary pulley control pressure line 26. (In an identical portion of the hydraulic control system 10, another pulley control valve like the pulley control valve 46 may be connected to the second pulley control pressure line 28 shown in FIG. 1.)

A spool valve 74 is slidably disposed in a bore 76 of the pulley control valve 46. The pulley control pressure line 26 also communicates with a back side 69 of the spool valve 74 through a flow restrictor or narrowed orifice 71. When the pressure in the pulley control pressure line 26 creates a force in addition to spring force of the spring 75 that exceeds the force in the signal pressure line 88 created by signal pressure, the force on the back side 69 of the spool valve 74 pushes the spool valve 74 to the left in the orientation of FIG. 3.

When the spool valve 74 is in the open position (to the far right, in the orientation of FIG. 3), the outlet port 72 and inlet port 70 are in communication such that the valve supply line 44 communicates with the primary pulley control pressure line 26 and the valve supply line 44 fills the pulley set 14 with pressurized hydraulic fluid. The primary pulley control pressure line 26 may have a pressure sensor 82 in communication therewith.

As the spool valve 74 is selectively slid to the left in the orientation of FIG. 3, the spool valve 74 blocks the inlet port 70 and then opens the exhaust port 78, so that the exhaust port 78 is in communication with the outlet port 72. The exhaust port 78 is in communication with an exhaust line 79, which is connected to a blow-off valve 80. The blow-off valve 80 is set to a relatively low pressure, for example, in the range of about 3-5 psi, or less than 35 kPa. Accordingly, the blow-off valve 80 opens only if the pressure in the exhaust line 79 exceeds the pressure setting of the blow-off valve 80.

Figure 4:
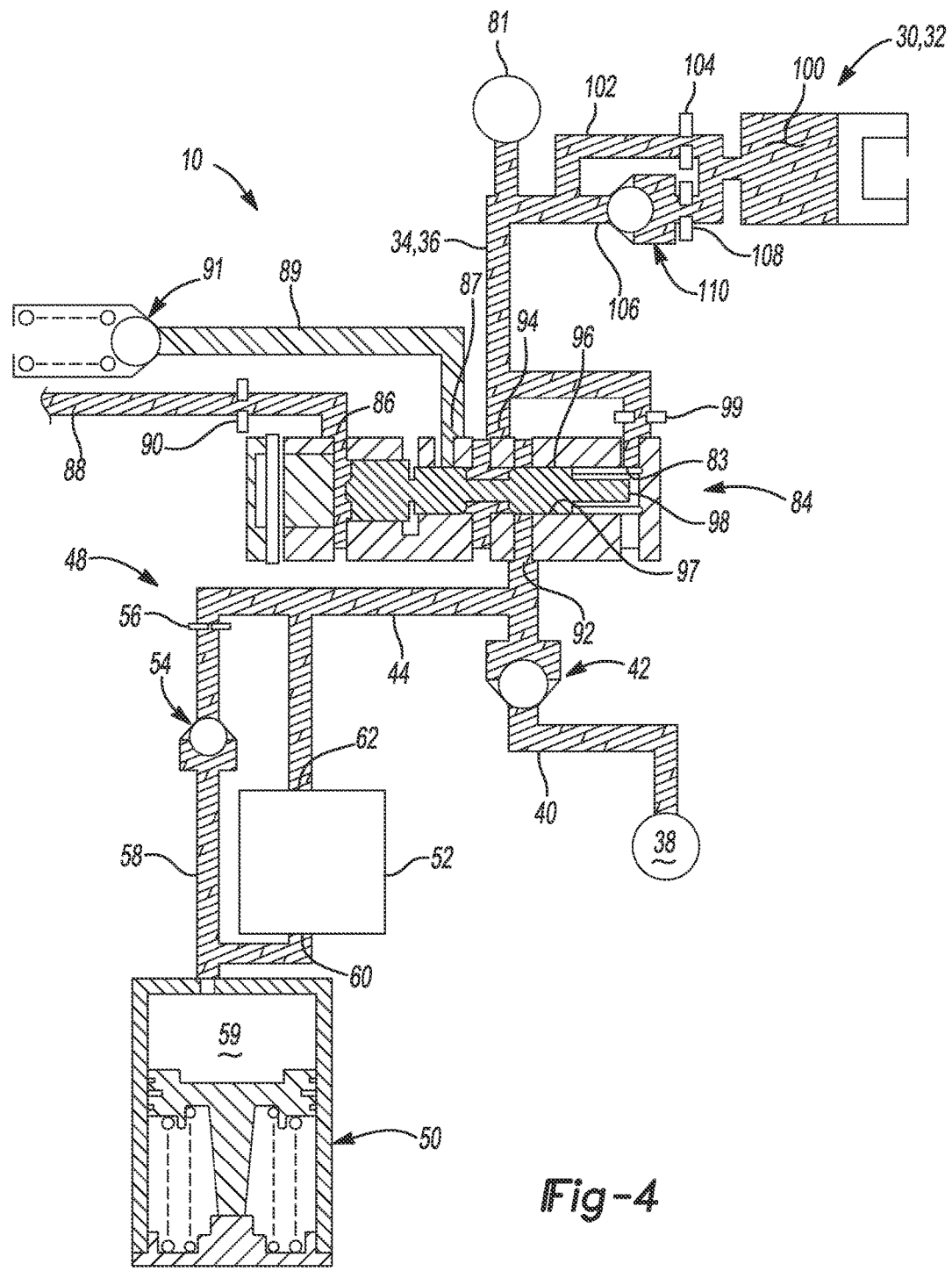
FIG. 4 is a flow diagram of the hydraulic control system of FIG. 3, including still additional portions thereof, in accordance with the principles of the present disclosure.

Referring now to FIG. 4, a portion of the hydraulic control system 10 is illustrated communicating with one of the drive or reverse CVT clutches 30, 32. At the outset it should be appreciated that the portion of the hydraulic control system 10 shown in the figures is exemplary and that other configurations may be employed. It should be understood that the CVT clutch 30, 32 illustrated in FIG. 3 could be either the drive CVT clutch 30, the reverse CVT clutch 32, or any other CVT clutch, as both could have similar or same components.

The source 38 of pressurized hydraulic fluid, the pressure supply line 40, the one-way valve 42, the valve supply line 44, and the accumulator circuit 48 (and its components 50, 52, 54, 56, 58) from FIG. 3 are also present and illustrated in FIG. 4. Therefore, in addition to being in communication with the pulley control valve 46 of FIG. 3, it should be understood that the valve supply line 44 could also be in communication with a CVT clutch regulator valve 84. As hereinbefore described, the source 38 of pressurized hydraulic fluid communicates hydraulic fluid under pressure to supply line pressure to a pressure supply line 40. The pressure supply line 40 is connected to a one-way valve 42, such as a ball check-valve, that communicates the pressurized hydraulic fluid to a valve supply line 44. The valve supply line 44 is in communication with the CVT clutch regulator valve 84 and the accumulator circuit 48. One or more controllers (not shown) and solenoids (not shown) may control various components of the hydraulic control system 10, by way of example.

The CVT clutch regulator valve 84, which may be controlled by a solenoid (not shown), for example, includes an inlet port 86 to receive signal pressure from a signal pressure line 88. A flow restrictor or narrowed orifice 90 may be disposed in the signal pressure line 88 adjacent to the inlet port 86. The CVT clutch regulator valve 84 includes a supply inlet port 92 in fluid communication with the main pressure line 44. An outlet port 94 is in communication with the CVT clutch control line 34, 36.

A spool valve 96 is slidably disposed in a bore 97 of the CVT clutch regulator valve 84. The CVT clutch control line 34, 36 also communicates with a back side 98 of the spool valve 96 through a flow restrictor or narrowed orifice 99. When the pressure in the CVT clutch control line 34-36 creates a force in addition to the spring force of the spring 83 that exceeds the force in the signal pressure line 88, the force on the back side 98 of the spool valve 96 pushes the spool valve 96 to the left in the orientation of FIG. 4.

When the spool valve 96 is in the open position (to the far right, in the orientation of FIG. 4), the outlet port 94 and inlet port 92 are in communication such that the valve supply line 44 communicates with the CVT clutch control line 34, 36. The CVT clutch control line 34, 36 may have a pressure sensor 81 in communication therewith. Accordingly, when the CVT clutch regulator valve 84 is open, the valve supply line 44 supplies the CVT clutch control line 34, 36 and the CVT clutch 30, 32 with a fluid pressure to operate the CVT clutch 30, 32.

As the spool valve 96 slides to the left, the spool valve 96 blocks the inlet port 92 and then opens the exhaust port 87, so that the exhaust port 87 is in communication with the outlet port 94. The exhaust port 87 is in communication with an exhaust line 89, which is connected to a blow-off valve 91. The blow-off valve 91 is set to a relatively low pressure, for example, in the range of about 3-5 psi, or less than 35 kPa. Accordingly, the blow-off valve 91 opens only if the pressure in the exhaust line 89 exceeds the pressure setting of the blow-off valve 91.

The CVT clutch control line 34, 36 communicates with a chamber 100 of the CVT clutch 30, 32 through a first CVT clutch inlet line 102 that has a flow restrictor or narrowed orifice 104 disposed in the first CVT clutch inlet line 102. The CVT clutch control line 34, 36 also communicates with the chamber 100 of the CVT clutch 30, 32 through a second CVT clutch inlet line 106 that has a flow restrictor or narrowed orifice 108 and a one-way valve 110, in the form of a ball check-valve, disposed in the second CVT clutch inlet line 106. Thus, when the pressure of the fluid in the CVT clutch control line 34, 36 exceeds the pressure of the fluid in the chamber 100 of the CVT clutch 32, 34, the CVT clutch control line 34, 36 feeds fluid into the chamber 100. However, when the pressure of the fluid in the chamber 100 exceeds the pressure of the fluid in the CVT clutch control line 34, 36, the one-way valve 110 is closed (the ball is seated), and fluid slowly leaks out of the CVT clutch chamber 100 through the orifice 104.

Thus, the hydraulic control system 10 provides for minimum draindown of the pulley sets 14, 18 and the CVT clutches 30, 32. As such, the engine may be shut down automatically during stops of the vehicle, and restarted with minimal delay time because the CVT clutches 30, 32 and the pulleys 14, 18 remain substantially full of fluid even if the source 38 of pressurized fluid, including the pump, is shut off and the valve supply line 44 has no pressure supplied to it from the source 38. The one-way valve 42 keeps fluid pressure in the valve supply line 44 for a period of time. Furthermore, the start/stop valve 52 is closed and the one-way valve 54 holds fluid pressure within the accumulator 50, until the accumulator 50 is discharged into the valve supply line 44 through the start/stop valve 52.

Thus, the hydraulic fluid is trapped within the CVT clutches 32, 34 and the pulleys 14, 18 even when not actively pressurized through the supply line 40. Though the one-way valve 42 and the blow-off valves 80, 91 assist with keeping fluid pressure within the pulley control lines 26, 28 and the clutch supply lines 34, 36, the accumulator 50 is discharged into the valve supply line 44 to bring the valve supply line 44 and the fluid pressure in the pulleys 14, 18 and the CVT clutches 30, 32 up to a level that is suitable for operating the pulleys 14, 18 and the CVT clutches 30, 32.

The description of the invention is merely exemplary in nature and variations that do not depart from the general essence of the invention are intended to be within the scope of the invention. Such variations are not to be regarded as a departure from the spirit and scope of the invention.

What is claimed is:

1. A hydraulic control system for a continuously variable transmission, the hydraulic control system comprising:
   a source of pressurized hydraulic fluid configured to communicate pressurized hydraulic fluid via a supply line;
   a pulley control circuit configured to fill a plurality of pulleys with pressurized hydraulic fluid and axially move at least one pulley of the plurality of pulleys to adjust a speed ratio, the pulley control circuit including a pulley control valve assembly having a pulley valve inlet and a pulley valve outlet, the pulley valve inlet being in downstream fluid communication with the supply line, the pulley valve outlet being in direct fluid communication with only one of the plurality of pulleys, and wherein the pulley control valve assembly further includes a second pulley valve outlet and the second pulley valve outlet is in upstream fluid communication with a pulley exhaust circuit, the pulley exhaust circuit fluidly communicating with a pulley blow-off valve separate from the pulley control valve;
   an inlet valve disposed in downstream fluid communication with the supply line, the inlet valve configured to selectively communicate fluid from the supply line to the pulley control valve assembly, the inlet valve being further configured to close to keep fluid pressure in the pulley control circuit when fluid pressure in the pulley control circuit exceeds fluid pressure in the supply line; and
   an accumulator circuit in upstream fluid communication with the pulley control valve assembly and downstream fluid communication with the inlet valve, the accumulator circuit having an accumulator, an on-off valve, and a second one-way valve, the on-off valve being configured to open to allow the accumulator to pressurize the pulley control circuit, and the second one-way valve in upstream fluid communication with the accumulator and configured to open to charge the accumulator from the source of pressurized hydraulic fluid and configured to trap hydraulic fluid in the accumulator when fluid pressure in the accumulator exceeds fluid pressure in the supply line.

2. The hydraulic control circuit of claim 1, wherein the inlet valve is a one-way valve configured to allow fluid to flow from the supply line to the pulley control circuit, the one-way valve being configured to prevent fluid from flowing from the pulley control circuit to the supply line.

3. The hydraulic control circuit of claim 1, wherein the blow-off valve is a minimum pressure blow-off valve.

4. The hydraulic control circuit of claim 1, wherein the blow-off valve is configured to open at a minimum pressure from about 3 psi to about 5 psi.

* * * * *